United States Patent
McCall, IV et al.

(10) Patent No.: US 12,221,354 B2
(45) Date of Patent: **\*Feb. 11, 2025**

(54) SOLUBILITY ENHANCING COMPOSITION

(71) Applicant: ITI Technolgies, Inc., Leland, NC (US)

(72) Inventors: Samuel Horace McCall, IV, Leland, NC (US); David H. Creasey, Leland, NC (US)

(73) Assignee: ITI Technologies, Inc., Leland, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,198

(22) Filed: Feb. 3, 2022

(65) Prior Publication Data

US 2022/0153601 A1    May 19, 2022

Related U.S. Application Data

(63) Continuation of application No. 16/595,917, filed on Oct. 8, 2019, now abandoned.

(60) Provisional application No. 62/797,427, filed on Jan. 28, 2019.

(51) Int. Cl.
*C01C 1/24* (2006.01)
*C02F 5/08* (2023.01)

(52) U.S. Cl.
CPC . *C01C 1/24* (2013.01); *C02F 5/08* (2013.01)

(58) Field of Classification Search
None
See application file for complete search history.

(56) References Cited

U.S. PATENT DOCUMENTS

| | | | |
|---|---|---|---|
| 3,625,908 A | 12/1971 | Magin | |
| 4,834,912 A | 5/1989 | Hodgens, II et al. | |
| 5,989,595 A | 11/1999 | Cummins | |
| 7,192,618 B2 | 3/2007 | Cummins | |
| 7,384,901 B2 | 6/2008 | Joshi et al. | |
| 7,648,643 B1 | 1/2010 | Creasey | |
| RE41,109 E | 2/2010 | Cummins | |
| 7,964,015 B2 | 6/2011 | Creasey | |
| 8,012,511 B1 | 9/2011 | Cummins | |
| 8,298,998 B2 | 10/2012 | Creasey | |
| 8,361,938 B1 | 1/2013 | Creasey | |
| 8,691,285 B2 | 4/2014 | Cummins | |
| 8,722,031 B2 | 5/2014 | Lawson et al. | |
| 10,264,793 B2 | 4/2019 | Meccia | |
| 10,662,093 B2 | 5/2020 | Nicholas | |
| 2013/0315779 A1 | 11/2013 | Creasey et al. | |
| 2017/0280728 A1 | 10/2017 | Dautreiul | |

OTHER PUBLICATIONS

Liquid Ammonium Sulfate Solution Product Specifications. Hill Brothers Chemicals Co. 2016.
International Search Report and Written Opinion issued in counterpart PCT Application No. PCT/US2020/014333 dated Mar. 18, 2020 (ten (10) pages).

*Primary Examiner* — Tanisha Diggs

(74) *Attorney, Agent, or Firm* — E. Eric Mills; Nicholas P. Stadnyk; Maynard Nexsen, PC

(57) ABSTRACT

A solubility enhancing aqueous composition comprising a first solution comprising an anionic component comprising sulfate ions, alone or in combination with bisulfate ions, having a concentration from about 8.00 moles per liter to about 13.00 moles per liter of the first solution volume, and a cationic comprising ammonium ions having a concentration from about 1.45 moles per liter to about 2.01 moles per liter of the first solution volume, combined with a volume of water at least equal to the volume or weight of the first solution forming a second solution is provided. Variations of this general composition are also provided. The compositions are useful for enhancing solubility of a variety of molecules, typically metal ions.

9 Claims, 6 Drawing Sheets

SOLUBILITY ENHANCING COMPOSITION

CROSS-REFERENCE TO RELATED APPLICATIONS

This application is a continuation and claims priority to U.S. patent application Ser. No. 16/595,917 filed Oct. 8, 2019, which is related and claims priority to U.S. Provisional Patent Application No. 62/797,427 entitled "Solubility Enhancing Composition" filed on Jan. 28, 2019; the entire disclosure of which is incorporated herein by reference.

BACKGROUND

The present invention relates to an aqueous solubility enhancing composition comprising ionic ammonium and ionic sulfate molecules having various industrial uses.

Historically, chelating agents have been used to carry, for example, metal ions for industrial applications such as water treatment (see, e.g., U.S. Pat. No. 9,938,171). The '171 patent teaches a solid chelating compound having the formula: $((NH_4)_2SO_4)_a \cdot (H_2SO_4)_b \cdot (H_2O)_c \cdot (NH_4HSO_4)_x$ wherein "a" is at least 1, "b" is at least 1, "c" is at least 1, and "x" is between 1 and 10 which, when added to water, forms the same molecules, including ammonium bisulfate solids. The present invention does not form a chelating agent and is substantially free of solids, which has significant benefits to industrial applications which are further discussed herein below.

SUMMARY

The present invention includes a solubility enhancing aqueous composition comprising a first solution comprising an anionic component consisting essentially of sulfate ions, alone or in combination with bisulfate ions, having a concentration from about 8.00 moles per liter to about 13.00 moles per liter of the first solution volume, and a cationic component consisting essentially of ammonium ions having a concentration from about 1.45 moles per liter to about 2.01 moles per liter of the first solution volume, combined with a volume of water at least equal to the volume of the first solution forming a second solution.

The composition can further include in the first solution hydrogen ions in a concentration from about 17.38 to about 21.68 moles per liter of the total volume of the second solution.

In the composition, the second solution can be substantially free of solids.

In the composition, the second solution can be free of solids.

The present invention also includes a solubility enhancing aqueous composition comprising a first solution comprising an anionic component comprising sulfate ions, alone or in combination with bisulfate ions, having a concentration from about 8.00 moles per liter to about 13.00 moles per liter of the first solution volume, and a cationic comprising ammonium ions having a concentration from about 1.45 moles per liter to about 2.01 moles per liter of the first solution volume, combined with a volume of water at least equal to the volume of the first solution forming a second solution.

The composition can further include in the second solution hydrogen ions in a concentration from about 17.38 to about 21.68 moles per liter of the total volume of the second solution.

In the composition, the second solution can be substantially free of solids.

In the composition, the second solution can be free of solids.

The present invention can further include a solubility enhancing aqueous composition comprising an anionic component consisting essentially of sulfate anions having a concentration from about 8.00 moles per liter to about 13.00 moles per liter in about one-half of the final composition volume and a cationic component consisting essentially of ammonium ions having a concentration from about 1.45 moles per liter to about 2.01 moles per liter in about one-half the final composition volume.

The present invention can additionally include a solubility enhancing aqueous composition comprising an anionic component consisting essentially of sulfate anions having a concentration from about 8.00 moles per liter to about 13.00 moles per liter and a cationic component consisting essentially of ammonium ions having a concentration from about 1.45 moles per liter to about 2.01 moles per liter of no more than approximately one half the final composition volume wherein said liter volume for calculation for the volume of water comprising the ammonium ions and sulfate anions comprises at least one percent of the total volume of the composition.

The present invention can additionally include a solubility enhancing aqueous composition comprising an anionic component comprising sulfate anions having a concentration from about 8.00 moles per liter to about 13.00 moles per liter and a cationic component comprising ammonium ions having a concentration from about 1.45 moles per liter to about 2.01 moles per liter of no more than approximately one half the final composition volume wherein said liter volume for calculation for the volume of water comprising the ammonium ions and sulfate anions comprises at least one percent of the total volume of the composition.

The present invention can additionally include a solubility enhancing aqueous composition comprising a first solution comprising an anionic component comprising sulfate ions, alone or in combination with bisulfate ions, having a concentration from about 8.00 moles per liter to about 13.00 moles per liter of the first solution volume, and a cationic comprising ammonium ions having a concentration from about 1.45 moles per liter to about 2.01 moles per liter of the first solution volume, combined with a mass of water at least equal to the mass of the first solution forming a second solution.

The composition can further include in the first solution hydrogen ions in a concentration from about 17.38 to about 21.68 moles per liter of the total volume of the second solution.

In the composition, the second solution is substantially free of solids.

In the composition, the second solution is free of solids.

The present invention can further include a solubility enhancing aqueous composition comprising a first solution comprising an anionic component comprising sulfate ions, alone or in combination with bisulfate ions, having a concentration from about 8.00 moles per liter to about 13.00 moles per liter of the first solution volume, and a cationic comprising ammonium ions having a concentration from about 1.45 moles per liter to about 2.01 moles per liter of the first solution volume, combined with a mass of water at least equal to the mass of the sum of the ammonium ions and the sulfate ions in the first solution.

In the composition, the second solution is substantially free of solids.

In the composition, the second solution is free of solids.

The present invention can additionally include a solubility enhancing aqueous composition comprising a first solution comprising an anionic component comprising sulfate ions, alone or in combination with bisulfate ions, having a concentration from about 8.00 moles per liter to about 13.00 moles per liter of the first solution volume, and a cationic comprising ammonium ions having a concentration from about 1.45 moles per liter to about 2.01 moles per liter of the first solution volume, combined with a total mass of water from the sum of water used to solubilize ammonium sulfate plus added water at least equal to fifty percent of the mass of the sum of the ammonium ions and the sulfate ions in the first solution.

In the composition, the second solution is substantially free of solids.

In the composition, the second solution is free of solids.

BRIEF DESCRIPTION OF THE DRAWINGS

Features of the present invention will be more fully appreciated by reference to the following detailed description when taken in conjunction with the following drawings in which.

Figure 1:
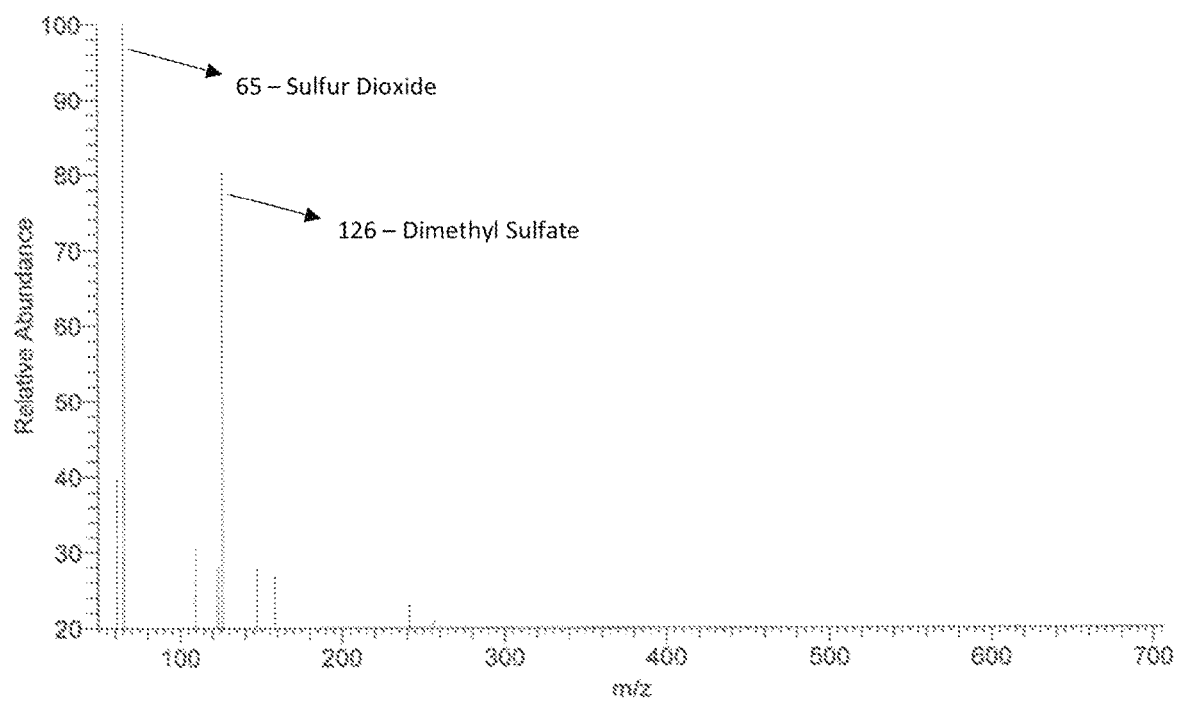
FIG. 1. depicts a low resolution spectrogram with 1 part reaction unit to 5 parts total.
Figure 2:
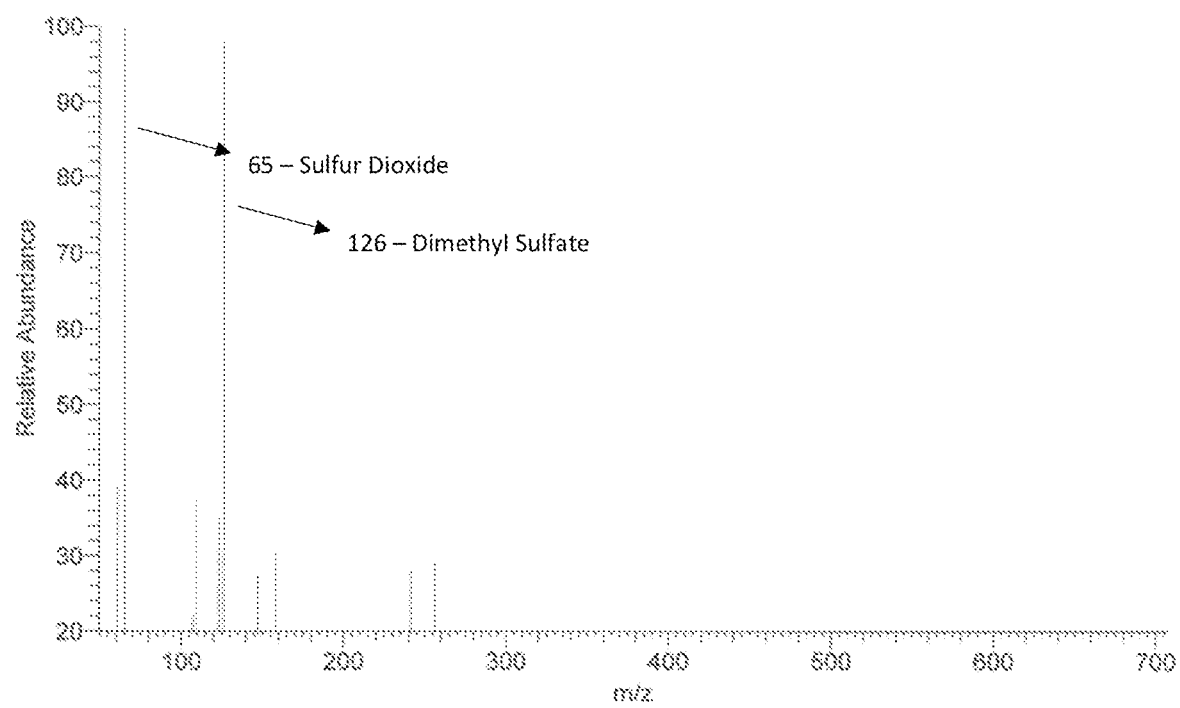
FIG. 2. depicts a high resolution spectrogram with 1 part reaction unit to 5 parts total.
Figure 3:
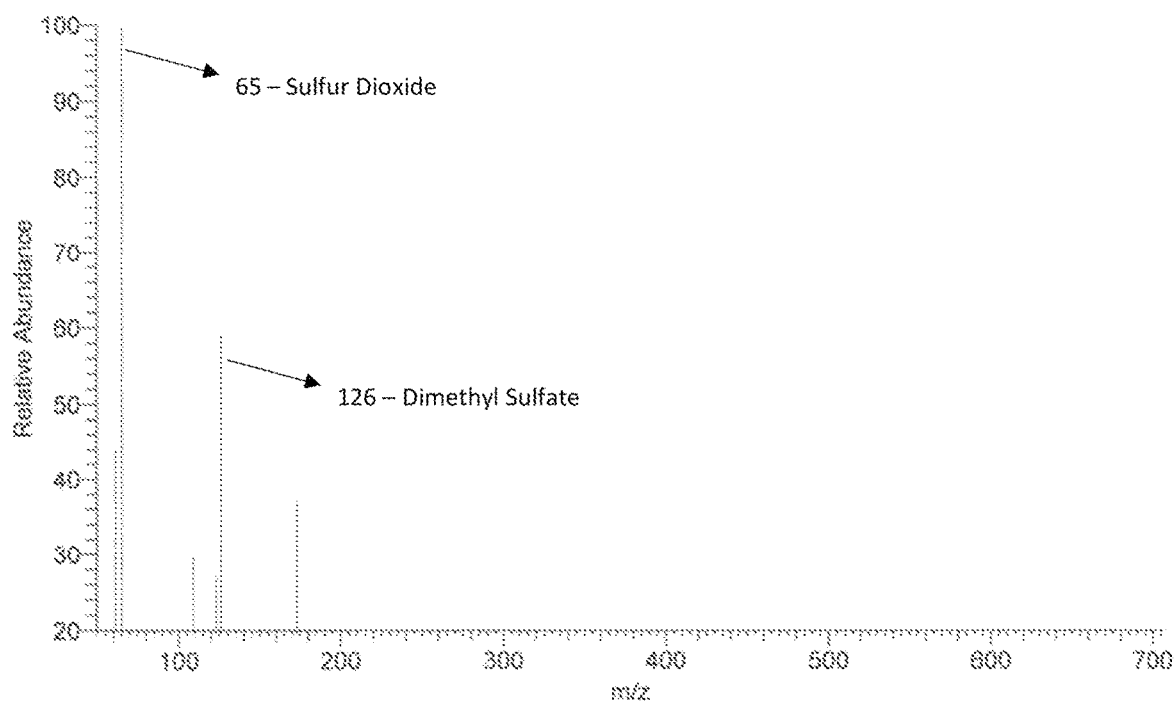
FIG. 3. depicts a low resolution spectrogram with 1 part reaction unit to 10 parts total.
Figure 4:
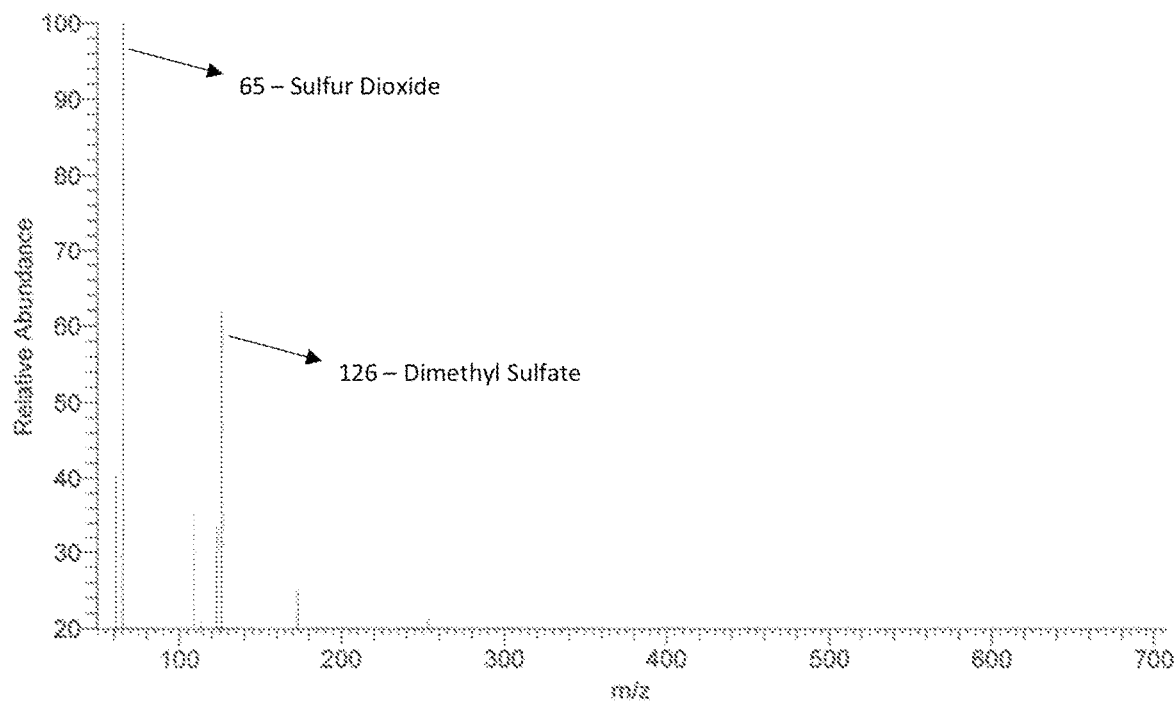
FIG. 4. depicts a high resolution spectrogram with 1 part reaction unit to 10 parts total.
Figure 5:
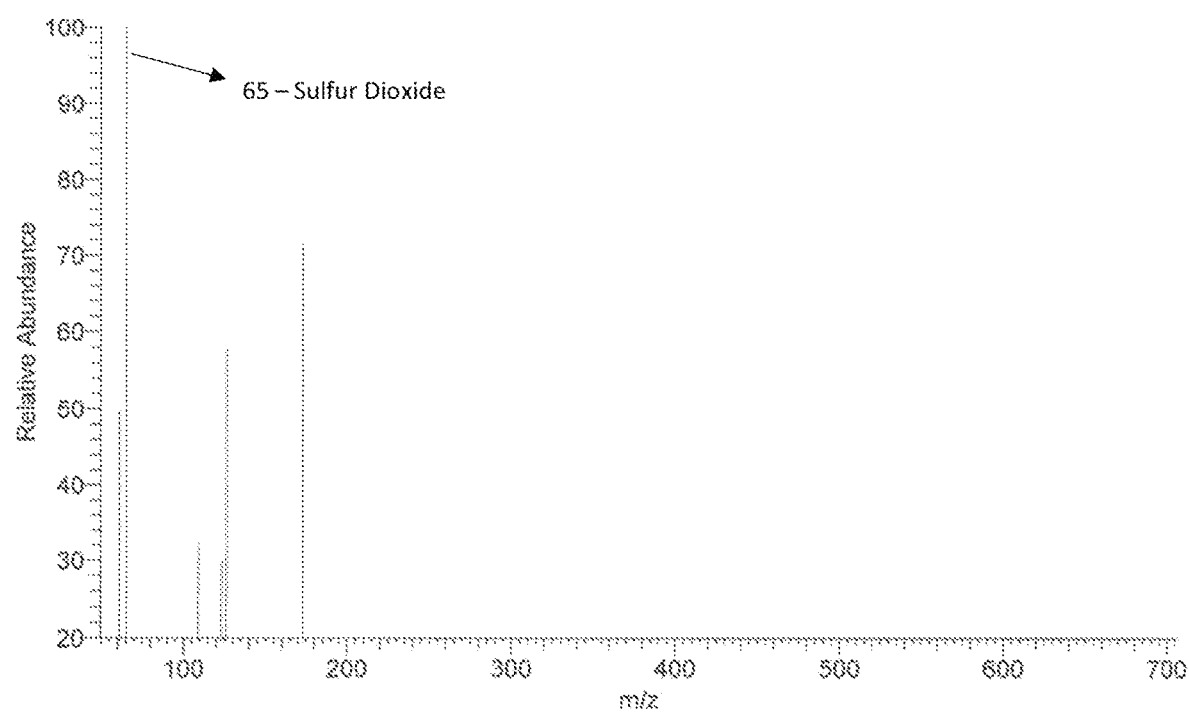
FIG. 5. depicts a low resolution spectrogram with 1 part reaction unit to 20 parts total.
Figure 6:
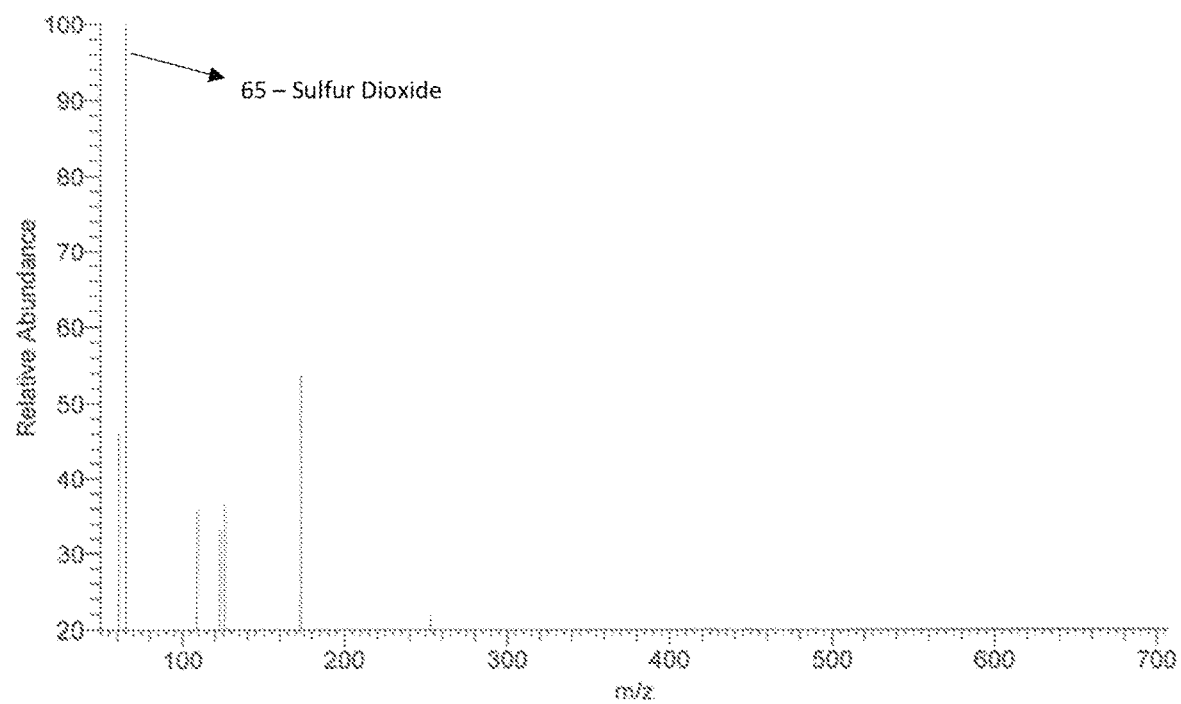
FIG. 6. depicts a high resolution spectrogram with 1 part reaction unit to 20 parts total.

Each of the spectrograms was run according to the respective teachings of Example 5. Each of the spectrograms depicts compositions that are free of salt crystals or other solids formed from the ammonium sulfate and sulfuric acid reactants.

While the disclosure is susceptible to various modifications and alternative forms, specific embodiments thereof are shown by way of example in the drawings and will herein be described in detail. It should be understood, however, that the drawings and detailed description are not intended to limit the disclosure to the particular forms illustrated but, on the contrary, the intention is to cover all modifications, equivalents and alternatives falling within the spirit and scope of the present disclosure as defined by the appended claims. The headings used herein are used for organizational purposes only and are not meant to limit the scope of the description. As used throughout this application, the word "may" is used in a permissive sense, meaning: "having the potential to"; rather than the mandatory sense meaning: "must". Similarly, the words "include", "including" and "includes" means including, without limitation. Additionally, as used in this specification and the appended claims, the singular forms "a', "an" and "the" include singular and plural referents unless the content clearly dictates otherwise.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combinations of features. In particular, with reference to the appended claims, features from dependent claims may be combined with those of independent claims and features from respective independent claims may be combined in any appropriate manner and not merely in the specific combinations enumerated in the appended claims.

DETAILED DESCRIPTION

Definitions

The term "first solution" means a solution of ammonium sulfate and sulfuric acid as further described herein.

The term "free of solids" means that the compositions of the present invention do not form salt crystals or other solids that remain in the composition over time, such salt crystals or other solids being formed from the reactants of ammonium sulfate and sulfuric acid.

The term "reaction unit" means the desired total volume of a first solution as expressed as a ratio of a range of ammonium sulfate concentrations to sulfuric acid concentrations (the reactants).

The term "second solution" means the first solution as prepared for a final volume plus the requisite amount of water to form a composition of the present invention as further described herein.

The term "sulfate anions" encompasses each of sulfate anions, bisulfate anions and combinations thereof. Combinations of sulfate anions and bisulfate anions are common in the compositions described herein.

The term "sulfuric acid" means concentrated sulfuric acid having a concentration of from about 95% to about 98%.

The term "substantially free of solids" means that the compositions of the present invention are at least 95 percent aqueous or, alternatively, at least 98 percent aqueous without the formation of salt crystals or other solids exclusively from the reactants of ammonium sulfate and sulfuric acid.

DESCRIPTION

The following description and examples are included to demonstrate the embodiments of the present disclosure. It should be appreciated by those of skill in the art that the compositions, techniques and methods disclosed in the examples herein function in the practice of the disclosed embodiments. However, those skilled in the respective arts should, in light of the present disclosure, appreciate that changes can be made to the specific embodiments and still obtain a like or similar result without departing from the spirit and scope of the disclosed embodiments.

The present specification includes references to "one aspect/embodiment" or "an aspect/embodiment". These phrases do not necessarily refer to the same embodiment although embodiments that include any combination of the features or elements disclosed herein are generally contemplated unless expressly disclaimed herein. Particular features, processes, elements or characteristics may be combined in any suitable manner consistent with this disclosure.

One aspect of the present invention provides a solubility enhancing aqueous composition comprising a first solution comprising an anionic component consisting essentially of sulfate ions, alone or in combination with bisulfate ions, having a concentration from about 8.00 moles per liter to about 13.00 moles per liter of the first solution volume, and a cationic component consisting essentially of ammonium ions having a concentration from about 1.45 moles per liter to about 2.01 moles per liter of the first solution volume, combined with a volume of water at least equal to the volume of the first solution forming a second solution. Alternatively, the first solution is combined with a volume of water, typically deionized water, at least equal to the mass of the first solution forming a second solution. Generally, the first solution of this composition will also comprise hydrogen ions in a concentration from about 17.38 to about 21.68 moles per liter of the total volume of the first solution.

Another aspect of the present invention provides a solubility enhancing aqueous composition comprising a first solution comprising an anionic component comprising sulfate ions, alone or in combination with bisulfate ions, having a concentration from about 8.00 moles per liter to about 13.00 moles per liter of the first solution volume, and a cationic comprising ammonium ions having a concentration from about 1.45 moles per liter to about 2.01 moles per liter of the first solution volume, combined with a volume of water at least equal to the volume of the first solution forming a second solution. Alternatively, the first solution is combined with a mass of water, typically deionized water, at least equal to the mass of the first solution forming a second solution. Generally, the first solution of this composition will also comprise hydrogen ions in a concentration from about 17.38 to about 21.68 moles per liter of the total volume of the first solution.

It is the intent of the present disclosure to permit the skilled artisan to prepare compositions of the present invention using a range of water in a ratio to the concentrations of ammonium sulfate and sulfuric acid for each preparation, with the resultant sulfate anions and ammonium anions, and the amount of water to be determined by such artisan, each within the parameters taught herein.

For the sake of clarity, three solutions are formed in preparing the second solution which comprises compositions of the present invention: 1) ammonium sulfate stock solution; 2) a first solution comprising the ammonium sulfate stock solution in sulfuric acid; and 3) second solution comprising compositions of the present invention.

To prepare the first solution of a composition of the present disclosure, one needs to first prepare an ammonium sulfate stock solution. For example and without limitation, an ammonium sulfate stock solution is prepared to contain 20%, 24%, 30%. 40%, 50% or 60% of ammonium sulfate in water, typically, without restriction, deionized water. For the sake of clarity, the percent concentration of ammonium sulfate can be any whole number or fraction thereof in a range from about 20% to about 60%. The molar concentration of the stock solution varies by the ammonium sulfate concentration in a known volume of water.

By means of exemplification, the following calculations are used to determine the amount of ammonium sulfate and sulfuric acid to add to form the first solution.

Ammonium Sulfate:

Ammonium sulfate equals 132.14 grams per mole. Using, for example, a 24% ammonium sulfate solution, such solution would have 240 grams of ammonium sulfate per 1 L of water. Because the ratio of ammonium sulfate to sulfuric acid in this exemplification is about 48% ammonium sulfate to about 52% sulfuric acid, the first solution would contain 115.20 grams of ammonium sulfate, equaling 0.872 moles per liter. As such, one mole of ammonium sulfate provides 2 moles of ammonium and 1 mole of sulfate. Accordingly, 0.872 moles of ammonium sulfate provides to the ammonium sulfate stock solution 1.744 moles of ammonium and 0.872 moles of sulfate required per liter of reaction in forming the first solution.

Sulfuric Acid (Concentrated):

Sulfuric acid equals 98.079 g/mole as concentrated (95% to 98%) reagent grade sulfuric acid. Sulfuric acid exists as a liquid and has a density of 1.840 g/mL. For this example, sulfuric acid comprises 52% of a first solution of 1 liter. As such, 520 mL (0.52 L) of sulfuric acid is added to the ammonium sulfate stock solution. 520 mL times 1.840 g/mL equals 956.8 grams. 956.8 grams divided by 98.079 grams per mole provides the target concentration of 9.755 moles of sulfuric acid per liter of preparation. 9.755 moles of sulfuric acid provides 9.755 moles of sulfate anion and 2 moles of hydrogen resulting from each mole of acid, in this example, 19.51 moles of hydrogen per liter of said first solution.

Reaction Unit:

Using the values set forth above, in this instance, there are about 0.872 moles of ammonium sulfate to about 9.755 moles of sulfuric acid providing:

about 0.872 moles of ammonium sulfate provides about 0.872 moles of sulfate and about 1.744 moles of ammonium required per reaction unit liter; and about 9.755 moles per liter of sulfuric acid provides about 9.755 moles of sulfate anion and about 19.51 moles of hydrogen per liter of reaction unit.

Using this example, each reaction unit, forming a first solution, would contain:

about 0.972 moles of sulfate (from ammonium sulfate) plus about 9.755 moles of sulfate from ammonium sulfate equaling about 10.627 moles of sulfate anion per liter comprising sulfate anions alone, bisulfate anions alone or, typically, a mixture of sulfate and bisulfate anions;

about 1.744 moles of ammonium per liter; and about 19.51 moles of hydrogen per liter.

To accomplish the formation of the compositions of the present invention, a second solution is formed by the addition of water, a critical component, in an appropriate amount as taught herein, to provide solubility enhancing aqueous compositions that are substantially free, or free, of solids. Alternatively, a first solution can be added to the appropriate amount of water to form a second solution. As such, the order of addition of a first solution to water or water to the first solution to form a second solution is not of consequence. Use of the present compositions may form solids when combined with other chemicals or other materials when using such compositions for its intended purpose: enhancing solubility of such chemical compounds or other materials.

Generally, water is at least fifty percent of the second solution, by mass or by volume, which represents the compositions of the present invention. Moreover, water can comprise from at least fifty percent up to ninety-nine percent of the second solution or final composition. However, the lower concentrations of water, as taught herein, are typically more useful for further use of the present compositions used for solubility enhancement. Accordingly, the amount of water used to form a second solution is at least 50% of the volume of the first solution or at least 50% of the mass of the first solution. Alternatively, the mass of the sum of the ammonium ion concentration plus sulfate ion concentration in a first solution can also serve as the basis of the amount of water to be added to form a second solution wherein the amount of water added, by mass, to form a second solution equals at least 50% of the sum of the mass of ammonium ions plus sulfate ions. Another means by which to represent the amount of water added to the first solution is that the amount of water used to form a second solution is at least equal to the volume of the first solution or at least equal to the mass of the first solution. Alternatively, the mass of the sum of the ammonium ions plus sulfate ions in a first solution can also serve as the basis of the amount of water to be added to form a second solution wherein the amount of total water, including the water used to solubilize the ammonium sulfate and added water, is at least equal to the sum of the mass of ammonium ions plus sulfate ions.

The amount of water used to prepare the second solution, representing compositions of the present invention, can be calculated in volume/volume (total volume of the first solution plus at least the same volume of water). Alternatively, the ratio of reactants to water (mass/mass) may be used. Using the values for ammonium sulfate and sulfuric acid from the above example, 115.20 grams of ammonium sulfate and 956.8 grams of sulfuric acid were used providing a sum of 1072 grams of reactants. Accordingly, for water to equal at least fifty percent of the final composition, at least 1072 grams of water are added to the first solution to form the second solution, a composition of the present disclosure. Alternatively, as referenced above, the amount of water used to form a second solution can be based on the total mass or volume of the first solution. Accordingly, any method taught herein can be used for calculating the amount of water required to form a second solution. As taught above, using the mass of the reactants to dictate the amount of water required to form a second solution is the minimum amount of water required to provide an aqueous solution and to impart the qualities of the compositions of the present invention as further delineated herein.

To achieve solubility enhancement, ranges of concentration of sulfate ions and ammonium ions in the present compositions are used while maintaining compositions that are essentially free or are free of salt crystals or other solids from the reactants that form a first solution. Accordingly, a first solution comprises an anionic component consisting essentially of sulfate ions, alone or in combination with bisulfate ions, has a concentration range from about 8.00 moles per liter to about 13.00 moles per liter of the first solution volume. The first solution also comprises a cationic component consisting essentially of ammonium ions has a concentration from about 1.45 moles per liter to about 2.01 moles per liter of the first solution volume. Typically, when the lower values within the range for sulfate ions are selected for preparing a first solution, a lower value within the stated range for ammonium ions is selected and included in the preparation of the first solution. Similarly, when higher values within the stated range for sulfate ions are selected for the preparation of a first solution, higher values of ammonium ions are selected for the preparation of a first solution. Although not imperative, typically, the sulfate ion concentration within the given range of from about 8.00 moles per liter to about 13.00 moles per liter of first solution volume is proportionally commensurate with the range of ammonium ion concentration within the given the given range of from about 1.45 moles per liter to about 2.01 moles per liter of first solution volume.

In another embodiment of the present invention, a first solution comprises an anionic component comprising sulfate ions, alone or in combination with bisulfate ions, has a concentration range from about 8.00 moles per liter to about 13.00 moles per liter of the first solution volume. The first solution also comprises a cationic component comprising ammonium ions has a concentration from about 1.45 moles per liter to about 2.01 moles per liter of the first solution volume. Typically, when the lower values within the range for sulfate ions are selected for preparing a first solution, a lower value within the stated range for ammonium ions is selected and included in the preparation of the first solution. Similarly, when higher values within the stated range for sulfate ions are selected for the preparation of a first solution, higher values of ammonium ions are selected for the preparation of a first solution. Although not imperative, typically, the sulfate ion concentration within the given range of from about 8.00 moles per liter to about 13.00 moles per liter of first solution volume is proportionally commensurate with the range of ammonium ion concentration within the given the given range of from about 1.45 moles per liter to about 2.01 moles per liter of first solution volume.

When prepared according to the embodiments provided herein, the resulting hydrogen ion concentration will typically fall within the range from about 17.38 moles per liter to about 21.68 moles per liter of first solution volume but falling within this hydrogen range is not necessarily critical to the final first solution but is beneficial when using the compositions of the present invention for enhancing solubility of compounds or other materials depending upon the nature thereof.

The process for preparing the compositions of the present invention can be carried out using traditional laboratory and safety equipment when using concentrated acid and water that could generate significant heat. Within these considerations, the selection of laboratory equipment is not critical to the formation of the present solutions or compositions. More particularly, the preparation of the first solution wherein the reactants ammonium sulfate stock solution is combined with sulfuric acid requires laboratory apparatuses that are approved for heat generation, splashing and, potentially, pressure relief. Accordingly, the first solution should be prepared in a laboratory vessel that is not sealed providing for pressure relief, rather than a potential hazardous situation with pressure build up in an unrated vessel. The ordinarily skilled artisan should be knowledgeable in the selection and use of such apparatuses.

For commercial-scale production of compositions of the present invention, the ordinarily skilled artisan will recognize that the reaction between the solubilized ammonium sulfate and sulfuric acid is typically exothermic. As such, a reaction vessel appropriate to safely contain and, typically, cool this reaction, is recommended. Commercial production of a first solution and a second solution can be accomplished using any of the teachings herein but on a larger scale than the laboratory scale teachings and examples disclosed herein. Moreover, such commercial production can be accomplished, without limitation, as taught herein or with equipment known to the ordinarily skilled artisan.

The order of adding the reactants to each other is not critical in the preparation of a first solution. Either the stock ammonium sulfate solution can be added to the sulfuric acid or sulfuric acid is added to the stock ammonium sulfate stock solution to avoid the splattering typical of adding a solution containing water to acid. Typically, the heat generating reaction forming the first solution is permitted to run to conclusion, with the term "conclusion" having the meaning understood by the ordinarily skilled artisan, prior to adding the first solution to the required water or water to the first solution, without preference to the order of addition. For the sake of clarity, conclusion of the reaction between the ammonium sulfate stock solution and sulfuric acid typically occurs when the reactants no longer produce an exothermic reaction and the temperature of the solution begins to decrease to ambient temperature.

Alternatively, the formation of a first solution is not required and the ammonium sulfate stock solution and sulfuric acid can be combined with the final desired volume of a composition of the present invention. Accordingly, another aspect of the present invention provides a solubility enhancing aqueous composition comprising an anionic component consisting essentially of sulfate anions having a concentration from about 8.00 moles per liter to about 13.00 moles per liter comprising about one-quarter of the final composition volume or less, a cationic component consisting essentially of ammonium ions having a concentration from about 1.45 moles per liter to about 2.01 moles per liter of about one-quarter of the final composition volume or less, and water comprising at least one-half of the final composition volume.

An additional aspect of the present invention provides a solubility enhancing aqueous composition comprising an anionic component comprising sulfate anions having a concentration from about 8.00 moles per liter to about 13.00 moles per liter comprising about one-quarter of the final composition volume or less, a cationic component comprising ammonium ions having a concentration from about 1.45 moles per liter to about 2.01 moles per liter of about one-quarter of the final composition volume or less and water comprising at least one-half of the final composition volume.

Another aspect of the present invention further provides a solubility enhancing aqueous composition comprising an anionic component consisting essentially of sulfate anions having a concentration from about 8.00 moles per liter to about 13.00 moles per liter and a cationic component consisting essentially of ammonium ions having a concentration from about 1.45 moles per liter to about 2.01 moles per liter of the final composition volume wherein said liter volume for calculation for the volume of water comprising the ammonium ions and sulfate anions comprises at least one percent of the total volume of the composition.

A further aspect of the present invention provides a solubility enhancing aqueous composition comprises an anionic component consisting essentially of sulfate anions having a concentration from about 8.00 moles per liter to about 13.00 moles per liter of not more than about one-half of the final composition volume and a cationic component consisting essentially of ammonium ions having a concentration from about 1.45 moles per liter to about 2.01 moles per liter of not more than about one-half the final composition volume.

Another aspect of the present invention provides a solubility enhancing aqueous composition comprising an anionic component comprising sulfate anions having a concentration from about 8.00 moles per liter to about 13.00 moles per liter of not more than about one-half of the final composition volume and a cationic component comprising ammonium ions having a concentration from about 1.45 moles per liter to about 2.01 moles per liter of not more than about one-half the final composition volume.

Although certain aspects of the present invention allow for highly dilute concentrations for the ammonium ions and sulfate anions, specific concentrations of these ions can be calculated on a basis as if such combination were prepared on a per liter basis wherein the volume of such preparation comprises 1%, 10%, 20%, 30%, 40%, 48% or 50% of the total volume or mass of the final composition. r the sake of clarity, the volume of water can be any whole number or fraction thereof in a range from about 1% to about 60%. In addition, the volume of total water in each of the compositions taught herein can be calculated by a variety of methods as taught herein and are not limited by any one teaching. As such, the amount of water used to form a second solution of the present invention can be based on weight/weight (first solution weight to the weight of water added to form a second solution); mass/mass (first solution mass to the mass of water added to form a second solution; and mass/mass (the mass of the sum of ammonium ions and sulfate ions to the mass of total water in the second solution). Each of these methods can be used in a two-step process wherein a first solution is formed and water is added to form a second solution, or a one-step process where the elements of a second solution of the present invention are pre-calculated and added accordingly.

One benefit of using the present compositions for solubility enhancement is for industrial applications, particularly when solutions are sprayed in the formation of products or finishes that must have a high degree of consistency and/or smooth surfaces. Products used for solubilization of other materials, typically metals, frequently have a significant percentage of solids in such products, minimizing the consistency of coating, leaving imperfections on the coated surface. Moreover, a variety of low and high-pressure nozzles are used for deposition of such coatings or to blend with other materials in the preparation of various products. In these instances, any degree of solids used in the sprayed material creates wear on the spray nozzles, even nozzles made with stainless steel or other wear-resistant materials. Worn nozzles, even slightly worn nozzles for critical depositions, especially high pressure depositions, result in inconsistent depositions in terms of coating and/or thickness, rendering the process more expensive and, potentially, a need to rework or destroy the material on which the coatings are deposited.

For example, the compositions of the present invention can be used in many applications where chelated products have been the sole or primary tool used for certain industrial and or agricultural applications. Generally, the compositions of the present invention have the ability, with many uses, to minimize or eliminate issues associated with the use of chelating agents including the potential formation of solids, particularly salt crystals, creating deposition problems, accelerated wear and tear of deposition equipment, final product quality issues, and limitations of performance.

Uses of the present compositions are wide and varied. For example and without limitation, the present compositions can be used for industrial cleaning by dissolving metal ions and removing scale. Metal salts are known to cause scaling problems in boilers and heat exchangers found in the power, agricultural (dairy industries) and a myriad of other industries. Compositions of the present invention can be used to solubilize and help eliminate such metal salts and scale. As such, the present compositions are useful for applications requiring the dissolution and removal of metal salts, scales and other industrial cleaning applications.

For other uses of the present compositions, the addition or introduction of metal ions are desired and/or required. Examples of such uses include, for example and without limitation, agricultural uses (micronutrient fertilizers including, for example, iron), plastics formation and paper coatings. Regarding paper applications, the compositions of the present invention can effectively solubilize, for example and without limitation, copper and silver. The present compositions, plus copper and/or silver and other excipients, carriers, diluents, surfactants and the like effectively solubilize these metal ions allowing for uniform distribution of paper coatings that strengthen the paper and provide certain antimicrobial properties to the paper. The present compositions can also be used, for example and without limitation, to solubilize silver for use in photographic film preparations, forming water-soluble trace metals for use in food fortification, preparing nickel-chromium aluminum alloy thermal coatings, preparing high density nickel coatings for pre-spray or post-spray metal milling, preparing nickel and/or chromium anti-corrosion coatings and a myriad of other industrial and agricultural uses.

Although specific embodiments have been described above, these embodiments are not intended to limit the scope of the present disclosure, even where only a single embodiment is described with respect to a particular feature. Examples of features provided in this disclosure are intended to be illustrative rather than restrictive unless stated otherwise. The present disclosure is intended to cover such alternatives, modifications and/or equivalents as would be apparent to a person skilled in the art having the benefit of this disclosure.

It is to be understood that the present compositions are limited only to the ranges and or limitation set forth herein and not to variations within such ranges. It is also to be understood that the terminology used herein is for the purpose of describing particular embodiments only, and is not intended to be limiting.

Further modifications and alternative embodiments of various aspects of the embodiments described in this disclosure will be apparent to the skilled artisan in view of the present disclosure. It is to be understood that the forms of the embodiments shown and described herein are to be taken as the presently preferred embodiments. Elements and materials may be substituted for those illustrated and described herein, parts and processes may be reversed and certain features of the embodiments may be utilized independently, all as would be apparent to one skilled in the art after having the benefit of the description. Changes may be made in the elements described herein without departing from the spirit and scope of the appended claims.

EXAMPLES

Example 1. Preparation of an ammonium sulfate stock solution: Into a volumetrically calibrated common 250 mL beaker, 90 mL of deionized $H_2O$ was added. 20 grams of $(NH_4)_2SO_4$ was completely dissolved into the deionized water. The total volume was brought to 100 mL using additional deionized water. 20 grams $(NH_4)_2SO_4$ per 100 mL $H_2O$ is a 20% solution and is a 1.51 M solution.

Example 2. Direct preparation of a second solution without the prior preparation of a first solution wherein the ratio of a first solution equivalent to water addition in this step is four parts water to one part first solution equivalent:
  1.15 mL of 20% $(NH_4)_2SO_4$ was added to a common 10 mL polypropylene centrifuge tube
  8.0 mL deionized water added to tube
  0.850 mL of concentrated (95-98%) sulfuric acid $(H_2SO_4)$ added to tube with sufficient force to mix Example 3. Direct preparation of a second solution without the prior preparation of a first solution wherein the ratio of a first solution equivalent to water addition in this step is nine parts water to one part first solution equivalent:
  0.576 mL of 20% $(NH_4)_2SO_4$ was added to a common 10 mL polypropylene centrifuge tube
  9.0 mL deionized water added to tube
  0.424 mL of concentrated (95-98%) sulfuric acid $(H_2SO_4)$ added to tube with sufficient force to mix Example 4. Direct preparation of a second solution without the prior preparation of a first solution wherein the ratio of a first solution equivalent to water addition in this step is nineteen parts water to one part first solution equivalent:
  0.288 mL of 20% $(NH_4)_2SO_4$ was added to a common 10 mL polypropylene centrifuge tube
  9.5 mL deionized water added to tube
  0.212 mL of concentrated (95-98%) sulfuric acid $(H_2SO_4)$ added to tube with sufficient force to mix Example 5. Preparation of samples for liquid chromatography-mass spectrometry (LC-MS) analysis: Each of Examples 2, 3 and 4, following addition of the sulfuric acid:
  the centrifugation tubes were briefly capped and vortexed to mix thoroughly
  caps were loosened to vent. It was observed that the temperatures of the centrifugation tubes were greater than ambient temperature. Such temperature was not sufficient to melt the centrifugation tubes.
  reactions were allowed to run for about 60 minutes
  after completion of the reaction time, 1 mL samples of the reacted solutions were filtered through a 0.44 micro Pall syringe filter and placed into labeled mass spectrometry vials
  vials were loaded into a Thermo Q Exactive Plus MS system with a Vanquish LC front end
  LC Settings:
  0.25 ml/min
  40% methanol/60% water/0.1% formic acid
  column temp 30□
  Thermo Accucore AQ C18 polar end cap column (150 mm×3 mm)
  Injection volumes of 20 uL
  Low resolution parameters
  Full MS-SIM
  0-10 minutes
  Positive polarity
  Resolution: 70,000
  AGC Target: $3×10^6$
  Max IT: 200 ms
  Scan Range: 50-700 mz
  High resolution parameters
  Full MS/dd-$MS^2$
  0-7 minutes
  Positive polarity
  Full MS: Resolution: 70,500
  AGC Target: $3×10^6$
  Max IT: 100 ms
  Scan range: 50-700 mz
  dd-$MS^2$: Resolution: 17,500
  AGC target: $2×10^6$
  Max IT: 50 ms
  Scan range: 50-700 mz
  Minimum AGC Target: $2×10^3$ Example 6: Laboratory Preparations of First Solutions for Ion Chromatographic Quantification A 24% solution of ammonium sulfate was created by adding 96 grams of ammonium sulfate to 400 grams deionized water. The solution was mixed to completely dissolve the ammonium sulfate.
  Ten (10) identical 20 mL reactions were produced:
  9.6 mL of the preceding 24% ammonium sulfate solution was added to individually labeled common 50 mL conical tubes by way of calibrated macropipette
  10.4 mL of concentrated sulfuric acid (95-98% reagent grade) was added to each tube by way of calibrated micropipette with sufficient force to thoroughly mix Tubes were allowed to stand loosely capped for an hour for reaction to run to completion.

Example 7: Ion Chromatography (IC) Method

Samples from Example 6 were transferred to IC vials, diluted appropriately (1:2500) to bring the ionic concentrations into the range of testing equipment used, and ion chromatography was undertaken using the following parameters:
Ion Chromatography:
Dual Thermo Dionex Aquion
Anion Side:
Column: Dionex IonPac AS22 RFIC 4×250 mm
Mobile phase: carbonate/bicarbonate buffet at 4.8/1.2 mM
Flow: 1.2 mL/min isocratic
Suppressor: Dionex ADRS 600 4 mm
Sup. Voltage: 33 mA
Standard: IC STD for sulfate, 50-500 ppm
Anion cell: 35° C.
Anion column: 30° C.
18 minute run time
Cation Side:
Column: Dionex IonPac CS16 RFIC 5×250 mm
Mobile phase: 30 mM MSA solution
Flow: 1 mL/min isocratic
Suppressor: Dionex CDRS 600 4 mm
Sup voltage: 89 mA
Standard: IC STD for ammonium 20-100 ppm
Cation cell: 40° C.
Cation column: 35° C.
18 minute run time
All 25 uL injections Example 8. Ion Chromatography Results Using the sample preparations set forth in Example 6 and the ion chromatography methods set forth in Example 7, the following results (10 samples; 2 replicates) were obtained:

| Sulfate mol/L | Ammonium mol/L |
|---|---|
| 9.1904799 | 1.6264427 |
| Sulfate mol/L | Ammonium mol/L |
| 8.00-13.00 | 1.45-2.01 |

Example 9: Commercial Production of a Solubility Enhancing Composition First Solution Into a 500-gallon polyethylene conical-bottom tank was added 160.5 pounds (about 19.2 gallons) of deionized water. Upon addition of the water, a magnetic-driven shearing pump with an impeller was engaged, circulating the water in the tank. To the water was slowly added 50.7 pounds of pre-weighed ammonium sulfate (GAC Chemical Corp., Searsport Me., U.S.A.) to enable solubilization of the ammonium sulfate preparing a 31.6% ammonium sulfate solution. The recirculating pump was allowed to run for about 20 minutes for this batch size. Complete solubilization of the ammonium sulfate was visually confirmed by decanting about 250 mL of solution into a PET bottle that was allowed to stand undisturbed for about 15 minutes, confirming complete solubilization.

A 50-gallon Dietrich (Corpus Christi, Texas, U.S.A.) closed-loop, stainless steel-jacketed, glass-lined reactor was pre-cooled using a CTS T-230 cooling tower (Cooling Tower Systems, Macon, Georgia U.S.A.) circulating a mixture of municipal water and sufficient sodium hypochlorite to maintain a pH from about 7.5 to about 7.8. To this reactor was added 400.6 pounds (about 26.1 gallons) of 98% sulfuric acid (Brenntag; Henderson, Kentucky U.S.A.) while a shaft-driven paddle mixer was engaged at 1700 rpm. To the sulfuric acid was rapidly added the ammonium sulfate solution and was mixed for about 20 minutes (until the reaction mixture cooled to a temperature of about 130 degrees Fahrenheit) at which time the reaction to form this first solution was complete.

Example 10: Commercial Production of a Solubility Enhancing Composition Second Solution To a one thousand gallon polyethylene conical-bottom tank is added deionized water equal to the volume or mass of the first solution. To this water is added the first solution. The resulting mixture represents a second solution of the present invention.

Example 11: Ion Chromatography Results

Using the sample preparations set forth in Example 9 and the ion chromatography methods set forth in Example 7, the following results (averages of 3 replicates of 3 samples) were obtained:

| Sulfate mol/L | Ammonium mol/L |
|---|---|
| 10.77769681 | 1.677964718 |

Target Ranges:

| Sulfate mol/L | Ammonium mol/L |
|---|---|
| 8.00-13.00 | 1.45-2.01 |

We claim:

1. A solubility enhancing aqueous composition consisting essentially of an anionic component consisting essentially of sulfate ions, alone or in combination with bisulfate ions, having a concentration from about 8.00 moles per liter to about 13.00 moles per liter of the composition volume; a cationic component consisting essentially of ammonium ions having a concentration from about 1.45 moles per liter to about 2.01 moles per liter of the composition volume; and hydrogen ions in a concentration from about 17.38 mols per liter to about 21.68 moles per liter of the composition volume.

2. The composition of claim 1, wherein said composition is substantially free of solids.

3. The composition of claim 1, wherein said composition is free of solids.

4. A solubility enhancing aqueous composition comprising an anionic component comprising sulfate ions, alone or in combination with bisulfate ions, having a concentration from about 8.00 moles per liter to about 13.00 moles per liter of the composition volume; a cationic component comprising ammonium ions having a concentration from about 1.45 moles per liter to about 2.01 moles per liter of the composition volume; and hydrogen ions in a concentration from about 17.38 moles per liter to about 21.68 moles per liter of the composition volume.

5. The composition of claim 4, wherein said composition is substantially free of solids.

6. The composition of claim 4, wherein said composition is free of solids.

7. A solubility enhancing aqueous composition consisting of an anionic component consisting of sulfate ions, alone or in combination with bisulfate ions, having a concentration from about 8.00 moles per liter to about 13.00 moles per liter of the composition volume; a cationic component consisting of ammonium ions having a concentration from about 1.45 moles per liter to about 2.01 moles per liter of the composition volume; and hydrogen ions in a concentration from about 17.38 moles per liter to about 21.68 moles per liter of the composition volume.

8. The composition of claim 7, wherein said composition is substantially free of solids.

9. The composition of claim 7, wherein said composition is free of solids.

* * * * *